United States Patent
Ince et al.

(10) Patent No.: US 8,880,359 B2
(45) Date of Patent: Nov. 4, 2014

(54) TRANSMISSION SENSING AND MEASUREMENT SYSTEM

(75) Inventors: Marion Jack Ince, Mount Holly, NC (US); Charles Schwab, Fort Mill, SC (US); Jens Heim, Bergrheinfeld (DE)

(73) Assignee: Schaeffler Technologies GmbH & Co. KG, Herzogenaurach (DE)

( * ) Notice: Subject to any disclaimer, the term of this patent is extended or adjusted under 35 U.S.C. 154(b) by 463 days.

(21) Appl. No.: 13/248,755

(22) Filed: Sep. 29, 2011

(65) Prior Publication Data

US 2012/0078537 A1  Mar. 29, 2012

(51) Int. Cl.
G06F 19/00 (2011.01)
G01M 13/02 (2006.01)
F16C 41/00 (2006.01)

(52) U.S. Cl.
CPC ............ G01M 13/022 (2013.01); *F16C 41/008* (2013.01)
USPC ............... 702/42; 702/35; 702/113; 702/183; 702/185; 340/679; 340/686.3; 384/91

(58) Field of Classification Search
CPC ..................... G01M 13/022; F16C 41/008
USPC .......... 702/35, 42, 113, 183, 185; 340/539.1, 340/682, 679, 686.1, 686.3; 384/91, 448, 384/459, 445
See application file for complete search history.

(56) References Cited

U.S. PATENT DOCUMENTS

| 6,595,692 | B2 * | 7/2003 | Itou ............................... 384/448 |
|---|---|---|---|
| 6,701,780 | B2 | 3/2004 | Hofmann et al. |
| 7,034,711 | B2 * | 4/2006 | Sakatani et al. ........... 340/686.1 |
| 7,184,930 | B2 * | 2/2007 | Miyasaka et al. ............. 702/183 |
| 7,394,395 | B2 * | 7/2008 | Sakatani et al. .............. 340/679 |
| 7,631,553 | B2 | 12/2009 | Heim et al. |
| 7,860,663 | B2 * | 12/2010 | Miyasaka et al. ............... 702/35 |
| 8,616,041 | B2 * | 12/2013 | Heim et al. .................... 73/1.15 |
| 8,642,252 | B2 * | 2/2014 | Clevenger et al. ............ 430/322 |
| 2003/0030565 | A1 * | 2/2003 | Sakatani et al. .............. 340/679 |
| 2006/0037411 | A1 | 2/2006 | Hofmann et al. |
| 2006/0145881 | A1 * | 7/2006 | Sakatani et al. .............. 340/679 |
| 2006/0167659 | A1 * | 7/2006 | Miyasaka et al. ............. 702/185 |
| 2007/0118333 | A1 * | 5/2007 | Miyasaka et al. ............. 702/183 |
| 2008/0234964 | A1 * | 9/2008 | Miyasaka et al. ............. 702/113 |
| 2008/0304779 | A1 | 12/2008 | Heim et al. |
| 2010/0262344 | A1 | 10/2010 | Fujii et al. |
| 2011/0037269 | A1 * | 2/2011 | Poon et al. ...................... 290/55 |

* cited by examiner

*Primary Examiner* — Carol S Tsai
(74) *Attorney, Agent, or Firm* — Lucas & Mercanti, LLP

(57) ABSTRACT

A transmission sensing and measurement system. The system provides real-time feedback of various transmission operating characteristics which enables immediate synchronized shift calibration in response to vehicle operating conditions. The system can be applied to various transmission components and positions, such as bearing, shafts, and differentials. The system is arranged in a transmission assembly. By way of a method for measuring operating characteristics of the transmission where data is collected by a sensor and transmitted, optimal operating characteristics of the transmission can be calculated.

19 Claims, 7 Drawing Sheets

TRANSMISSION SENSING AND MEASUREMENT SYSTEM

The present invention relates generally to transmissions and more particularly to bearing supporting transmission shaft systems that can sense and measure transmission operating characteristics.

BACKGROUND OF THE INVENTION

Bearing applications containing sensors are known. These applications are directed to wheel bearings and bearings used in engine systems to aid in controlling vehicle operation such as shift calibration. However, there is an error associated with estimating transmission operating conditions using data coming from outlying sensors not directly related to transmission function of load and torque characteristics. Thus, as a result of the error, efficient characteristics of transmission operating characteristics cannot be determined.

See, for example U.S. Pat. No. 6,701,780, which discloses a wheel bearing for measuring contact forces between tires of a vehicle and the road. Here, the wheel bearing unit utilizes a first sensor arranged on a stationary part of a wheel bearing for sensing forces between a rotatable part and the stationary part of the bearing and a second sensor arranged on a support member between the stationary bearing ring and a disk brake caliper to measure braking forces which act on the brake caliper during braking operation.

See also, U.S. Pat. No. 7,631,553, U.S. Patent Application No. 2008/0304779 (DE 10 2005 059 393 A1) and U.S. Patent Application No. 2006/0037411 (DE 10 228 412 A1) for other examples of sensors used with wheel bearings. U.S. Pat. No. 7,631,553 is directed to a bearing arrangement which has a measuring sleeve and a sensor mounted on the measuring sleeve. U.S. Patent Application No. 2008/0304779 (DE 10 2005 059 393 A1) directed to a wheel hearing, which includes a sensor that measures rotational or angular movements of a wheel of a motor vehicle. U.S. Patent Application No. 2006/007411 (DE 10 228 412 A1) directed to a wheel bearing with a sensor mounted on a stationary part of the bearing assembly that measures braking forces.

Moreover, see for example U.S. Patent Application No. 2010/0262344, which teaches a method and system of closed-loop phase control for shifting automatic transmission gear ratios based on friction element load sensing. Here, the system includes multiple sensors for measuring torque, actuators for increasing the torque capacity and a controller which also is intended to increase torque.

SUMMARY OF THE INVENTION

The present invention is directed to a transmission sensing and measurement system. The system provides real-time feedback of various transmission operating characteristics (e.g., forces, torques, moments) enabling immediate synchronized shift calibration in response to vehicle operating conditions. The transmission sensing and measurement system can be applied to various transmission components and positions, such as bearings, shafts, and differentials. The system optimizes transmission efficiency and life, allows for increased fuel economy, improved vehicle performance, and enhanced driver satisfaction.

The sensing and measurement system can be applied to various transmission components and positions including the bearing inner rings) or outer ring(s), bearing supports for a main shaft, bearing supports for a countershaft driving differential or directly within the differential. Typically, a sensor for measuring strain and temperature and an integrated circuit with signal conditioning are integrated directly into the bearing inner ring or outer ring. The sensor is fixed, preferably coated, onto the stationary part. The stationary part can include precautions to lock the stationary part against rotation. This increases the precision of the force and torque output. The sensor can also be mounted to the rotating or moving part. Alternatively, the sensor(s) can be a stand-alone unit. The measurement data and energy can be transmitted using telemetry (e.g., radio transmitting, inductive coupling, or capacity coupling). For example, strain data is derived from the forces acting on the bearing outer ring, from the loads applied to the bearing inner ring. Measurement of strain data is amplified, filtered, and converted from analog to digital. Data is calculated with an algorithm resulting forces, moments, and torques, which are transmitted on a network through a controller Further, the analyzed system data can be combined with wheel and engine data for total vehicle feedback and control, resulting in a fully optimized and efficient automobile.

It should be noted that the transmission sensing and measurement system can be applied to any transmission bearing arrangement. For example, the transmission sensing and measurement system can be applied to roller bearings, angular contact ball bearings, tandem ball bearings, deep groove ball bearings, tapered roller bearings, or the like.

Broadly, the present invention can be defined as a sensing and measurement system for a transmission assembly, which cart comprise a bearing assembly that can include an outer ring, an inner ring, a plurality of roller bodies arranged between the outer ring and the inner ring, a sensor arranged directly on one of the rings and a cable link fixed to and extending from the sensor to transmit collected data.

The bearing assembly can be mountable in the transmission assembly on a transmission shaft that has a recess.

The outer ring of the bearing can have a flange mountable to a housing of the transmission via fasteners.

The first sensor can be mounted on an axial side of the inner ring or outer ring. Alternatively, the first sensor can be mounted on a radial surface of the inner ring or outer ring.

The sensor can be fixed to the outer ring.

The inner ring or the outer ring can be stationary and the sensor can be fixed to the stationary ring. Furthermore, the stationary ring includes precautions to lock the ring against rotation.

The sensing and measurement system can further comprise a second sensor with the first sensor being mounted on the inner ring or outer ring and the second sensor being mounted on the other of the inner ring or outer ring. The first sensor and second sensor can be mounted on an axial side of the inner ring and/or outer ring. Alternatively, the first sensor and the second sensor can be mounted on the radial side of the inner ring and/or outer ring.

The sensing and measurement system can further include bearing supports on which the sensor is mounted.

The transmission assembly can further include a differential which includes a housing with the bearing assembly being mounted directly within the housing of the differential.

The data collected by the sensor can include axial loading, radial force, and transmitted torque.

The data collected by the sensor can be measured directly within the transmission assembly.

The data measured by the sensor can be transmitted by telemetry.

The data measured can be amplified, filtered, and converted from analog to digital.

The sensing and measurement system can further comprise a processor that can process the data and calculate optimal operating characteristics by an algorithm resulting in forces, moments, and torques, which are transmitted on a network through a controller to the transmission assembly.

The transmission sensing and measurement system can be calibrated prior to installation.

The data which is analyzed can be combined with wheel and engine data of a vehicle.

Further, the present invention can be defined as a method for measuring operating characteristics of a transmission where the method can comprise the steps of: assembling a bearing, which can have a outer ring, an inner ring, a plurality of roller bodies arranged between the outer ring and the inner ring, a sensor arranged directly on one of the rings and a cable link fixed to and extending from the sensor to transmit data collected for review, analysis and adjustment of operating characteristics, in a housing of the transmission; measuring strain data on the bearing via the sensor; amplifying, filtering, and converting the data from analog to digital; transmitting the data collected to a transmission controller; and processing the data and calculating optimal operating characteristics by an algorithm resulting in forces; moments, and torque, which are transmitted on a network through a controller to the transmission.

BRIEF DESCRIPTION OF THE DRAWINGS

The present invention will be further understood and appreciated by reading the following description in conjunction with the accompanying drawings, in which.

DETAILED DESCRIPTION OF THE INVENTION

Figure 1:
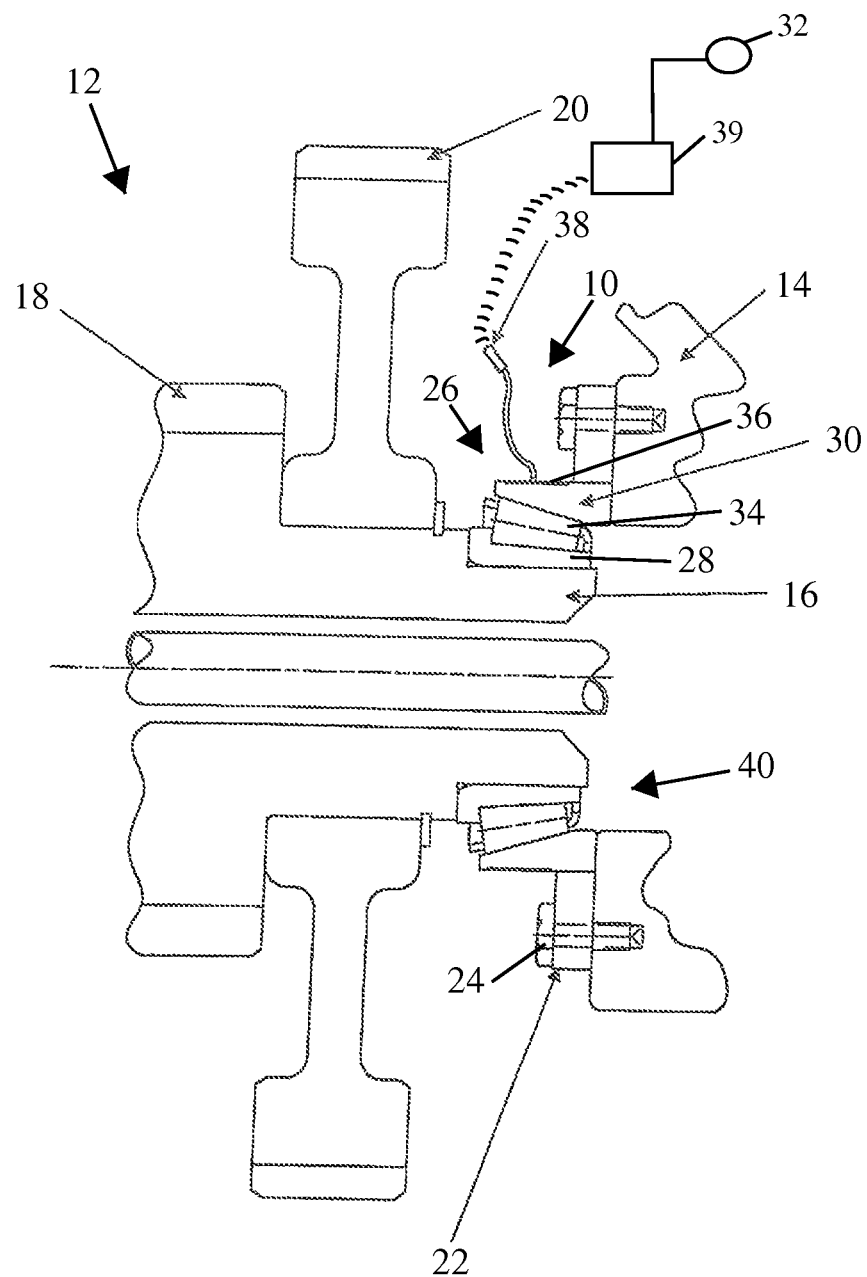
FIG. 1 is a cross-sectional view of a first application of a sensing and measurement system mounted in a transmission application.
Figure 2:
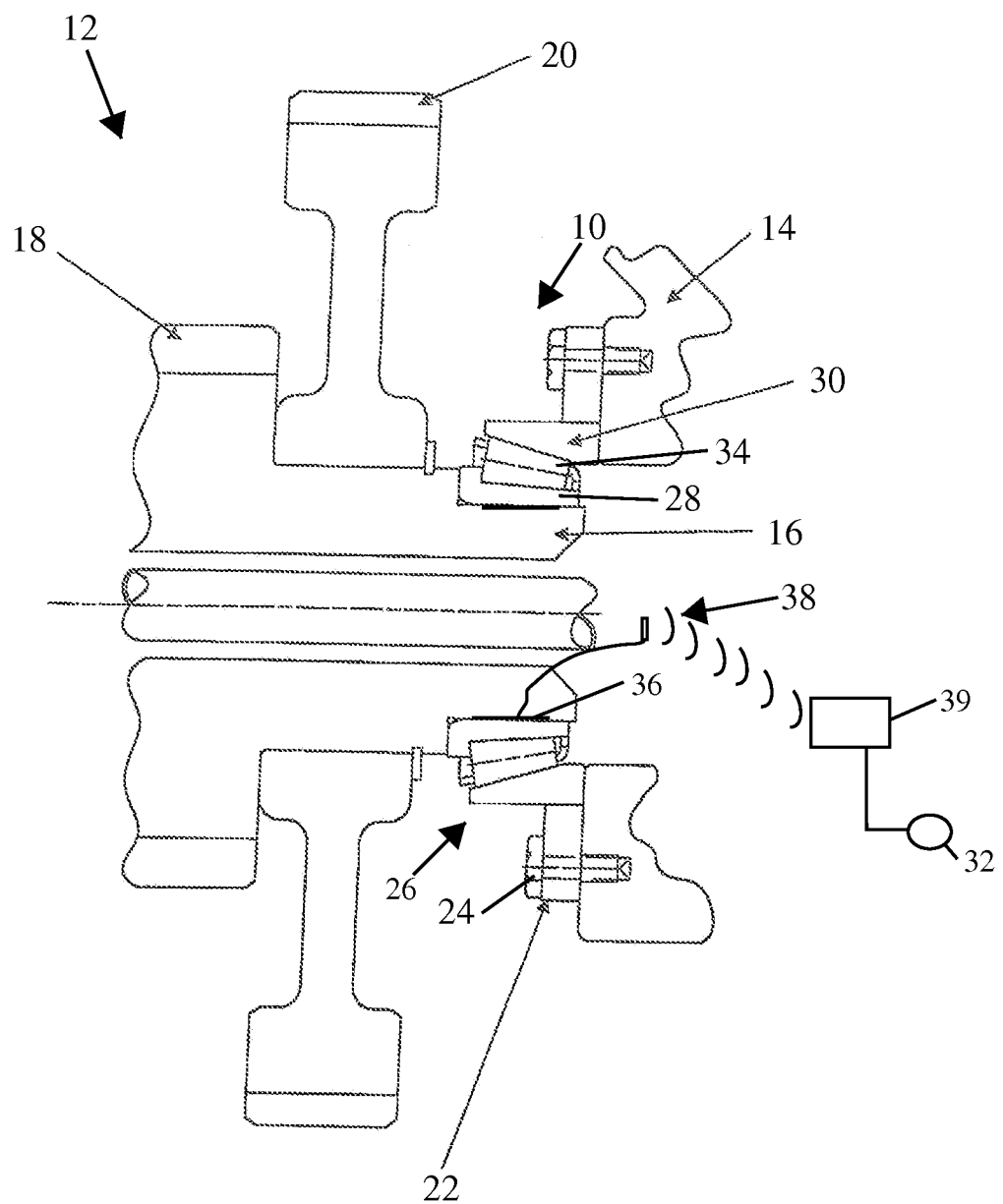
FIG. 2 is a cross-sectional view of a second application of the sensing and measurement system.
Figure 3:
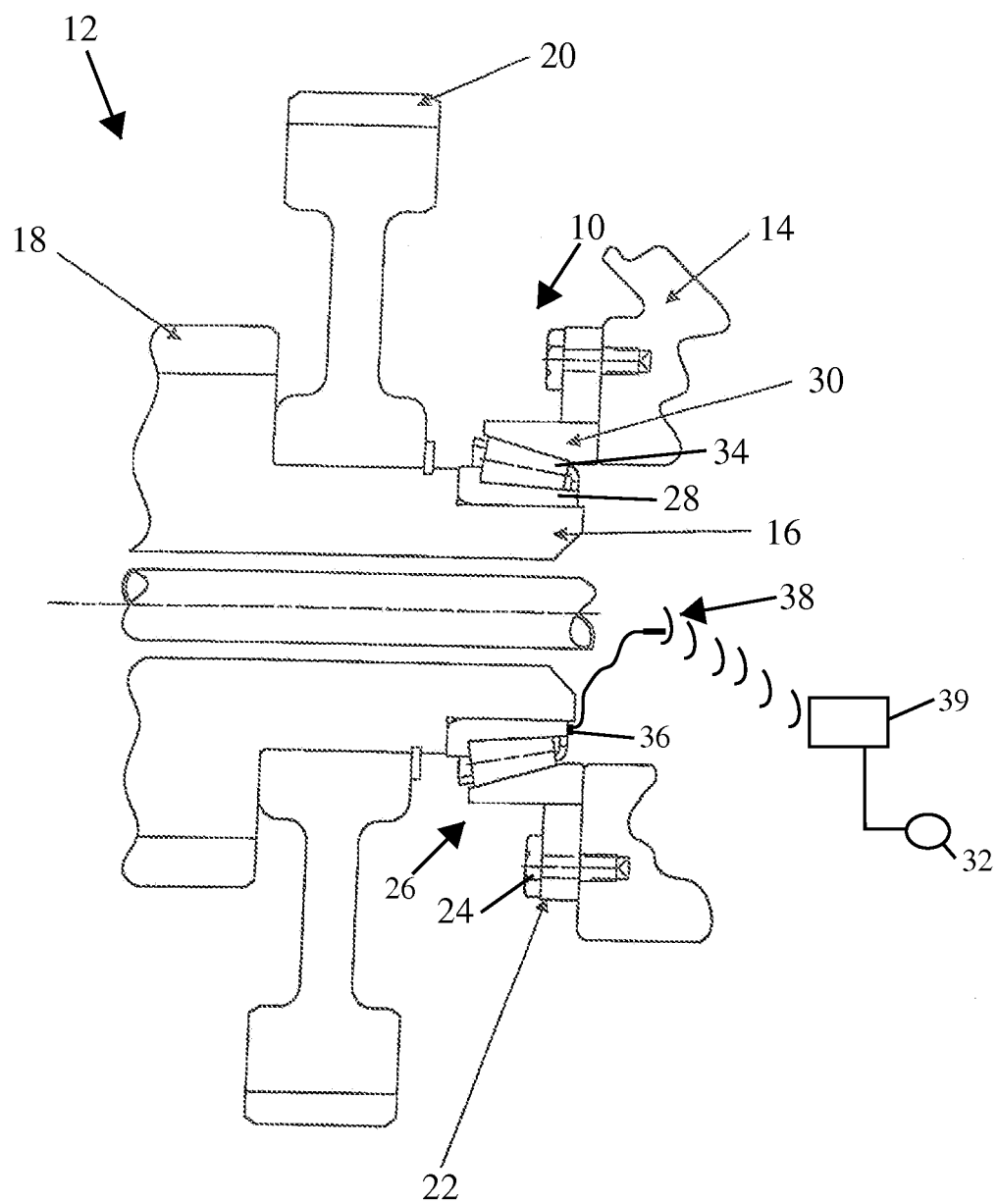
FIG. 3 is a cross-sectional view of a third application of the sensing and measurement system.
Figure 4:
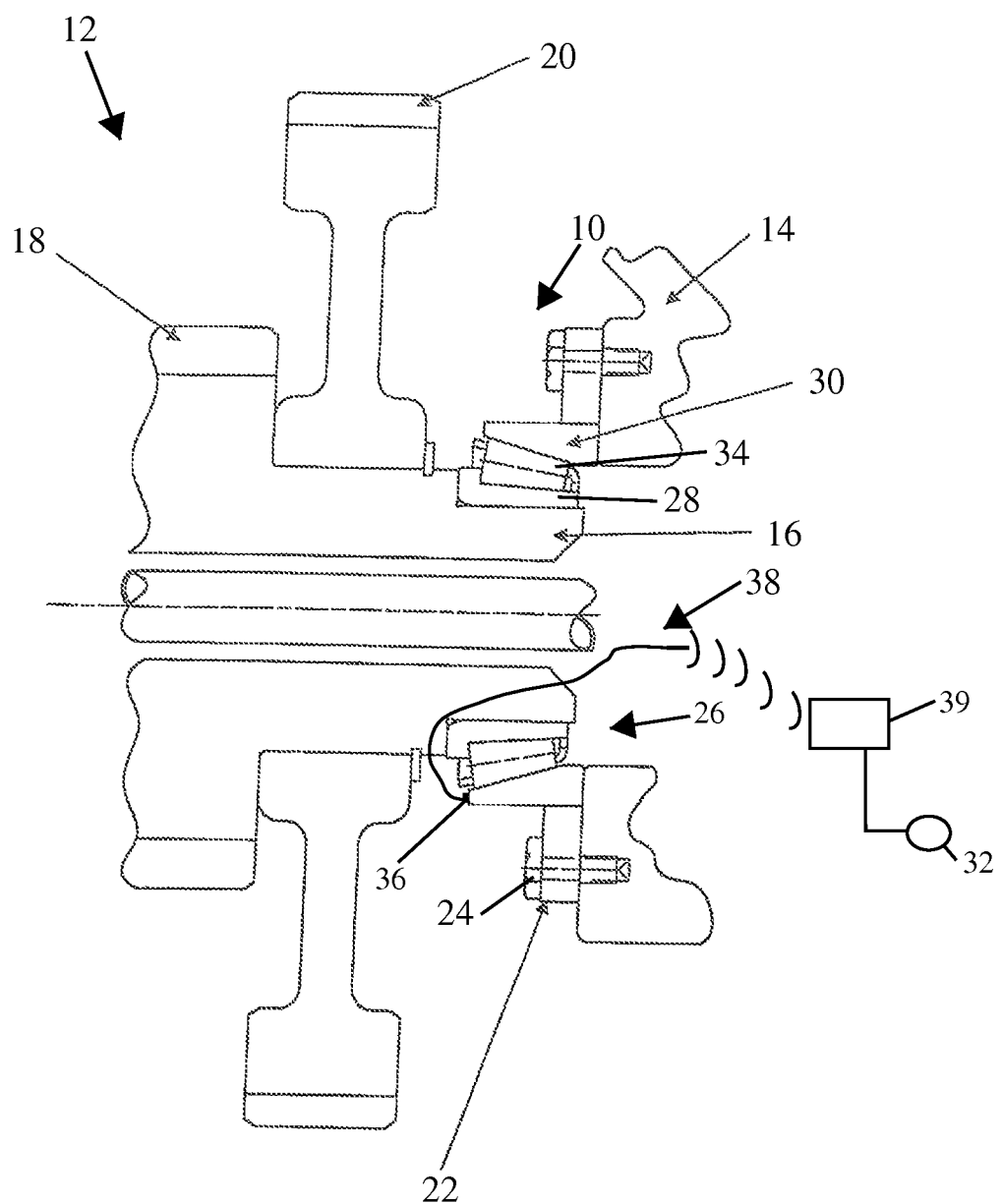
FIG. 4 is a cross-sectional view of a fourth application of the sensing and measurement system.

FIG. 1 illustrates a first application of a sensing and measurement bearing system 10 for a transmission system 12. The transmission system 12 includes transmission housing 14, a transmission shaft 16, a first gear 18 mounted on the transmission shaft 16, a second gear 20 mounted on the transmission shaft 16, and a bearing assembly 26. The bearing assembly 26 contains an inner ring 28, an outer ring 30 with a mounting flange 22, rollers 34 arranged between the inner ring 28 and the outer ring 30, and a sensor 36 with a cable link 38. The sensor 36 is typically fixed, for example by coating, to a radial surface of the ring 28, 30, which is not pressed into a bore, but fixed to the transmission housing 14. As shown in FIG. 1, the sensor 36 is fixed by the mounting flange 22 to the transmission housing 14 via a fastener 24 such that the mounting flange 22 enables the bearing 26 to be suspended in a cantilevered manner. This makes the system robust against tolerances in the mechanical interference between the bearing assembly 26 and the transmission housing 14. This in turn leads to increased measurement precision. As shown in FIG. 1, the sensor 36 is fixed to the outer ring 30. FIG. 2 shows an alternative embodiment where the sensor 36 is fixed to the inner ring 28. By viewing FIGS. 1 and 2 together, it can be understood that the sensor 36 can be fixed to both the inner ring 28 and the outer ring 30. In further embodiments, shown in FIGS. 3 and 4, the sensor 36 may be mounted to an axial surface of the inner ring 28 or the outer ring 30. By viewing FIGS. 3 and 4 together, it can be understood that the sensor 36 can be fixed to both the inner ring 28 and the outer ring 30.

As shown in FIGS. 1-4, the bearing assembly 26 is mounted in the transmission housing 14, on the transmission shaft 16. The bearing assembly 26 is arranged in a recess 40 of the transmission shaft 16. However, the bearing assembly 26 can also be arranged on any other aspect of the transmission shaft 16. Further, preferably, as shown, the outer ring 28 is a fixed ring. Also, although the mounting flange 22 is shown, any other means of connection can be used. Further, it should also be noted that the system can be calibrated prior to installation.

Also shown in FIGS. 1-4 are a processor 39 and a transmission controller 32. The processor 39, for example, aids in the calculation, amplification, filtration, and conversion of data.

Figure 5:
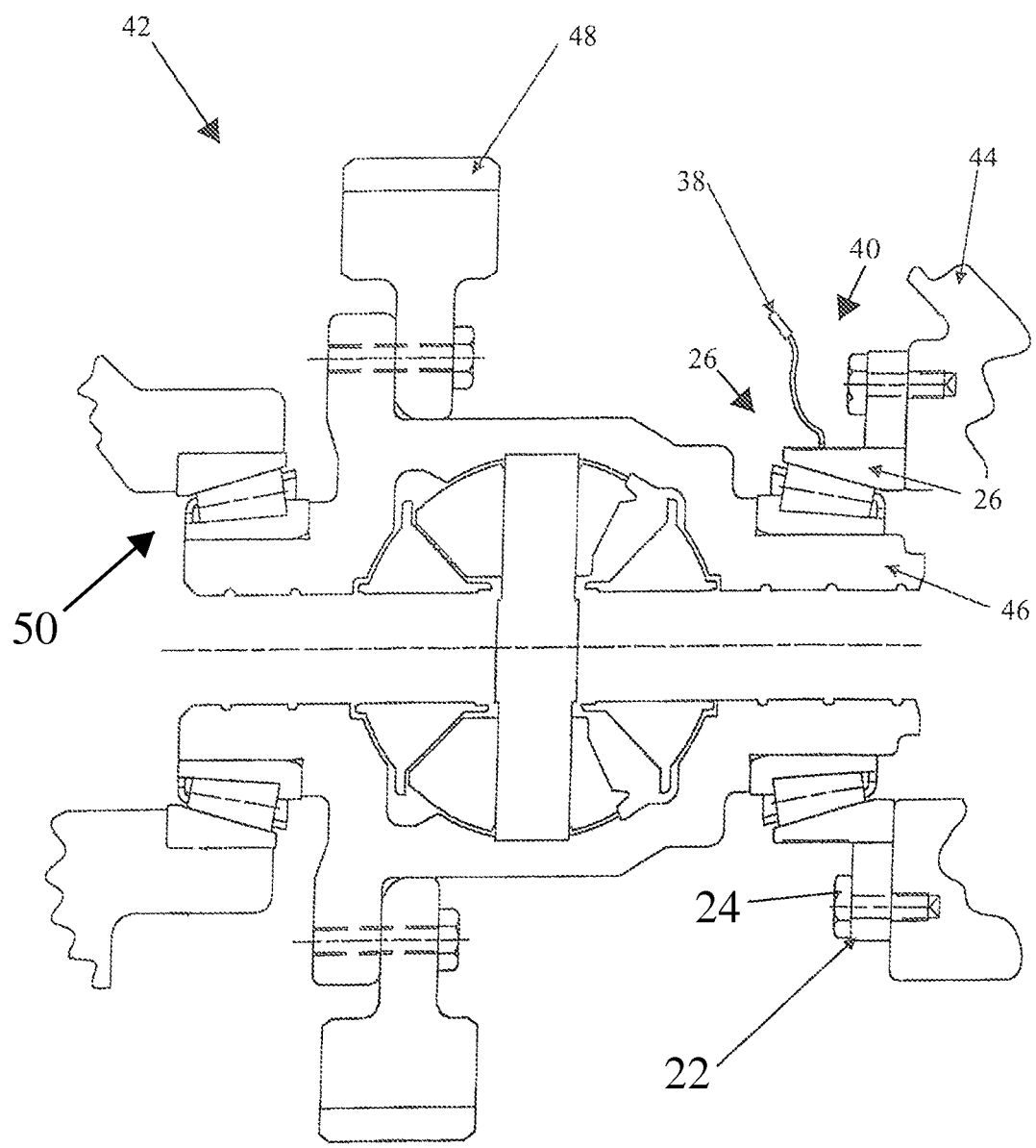
FIG. 5 is a cross-sectional view of the sensing and measurement system mounted with the arrangement shown in FIG. 1 in a differential application.

FIG. 5 illustrates another application of as sensing and measurement bearing system 40 for a differential application 42. The differential application 42 includes a differential housing 44, a differential shaft 46, a gear 48 fixed to the differential shaft 46, and the bearing assembly 26. The mounting flange 22 mounts the bearing assembly 26 to the differential housing 44 via the fastener 24. Additionally, a non-sensing bearing 50 can be included in the differential application 42. the differential housing 44 via the fastener 24. Additionally, a non-sensing bearing 50 can be included in the differential application 42.

Figure 6:
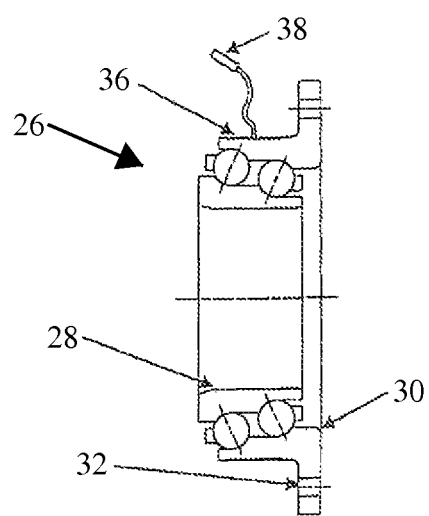
FIG. 6 is a cross-sectional view of the sensing and measurement system applied to a bearing system; an FIGS. 7-17 are partial cross-sectional views of various bearing applications that can be used in conjunction with the sensing and measurement system.

FIG. 6 to illustrates a cross-sectional view of the bearing assembly 26.

Figure 7:
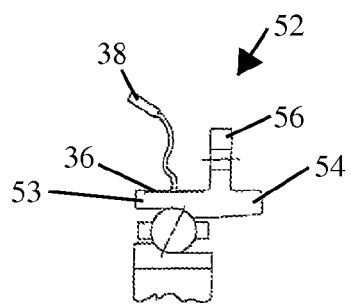

FIGS. 7-7 illustrate various bearing configurations with the sensor 36 arranged on an outer ring and the cable link 38 extending from the sensor 36. The configurations shown in FIGS. 7-7 can be combined in any combination and can apply alternatively to the inner ring.

FIG. 7 shows an angular contact bail bearing 52, on which the sensor 36 is arranged, that has an outer ring 53 with a mounting shoulder 54 and a flange 56.

Figure 8:
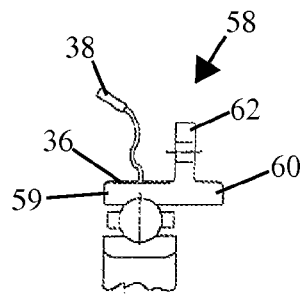

FIG. 8 shows a deep groove ball bearing 58, on which the sensor 36 is arranged, an outer ring 59 with a mounting shoulder 60 and a flange 62.

Figure 9:
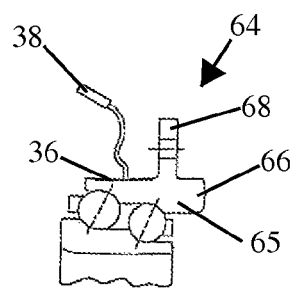

FIG. 9 shows a tandem ball bearing 64, on which the sensor 36 is arranged, an outer ring 65 with a mounting shoulder 66 and a flange 68.

Figure 10:
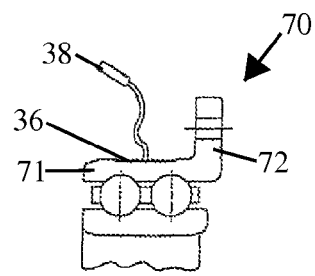

FIG. 10 shows a double row deep groove ball bearing 70, on which the sensor 36 is arranged, an outer ring 71 with a mounting flange 72.

Figure 11:
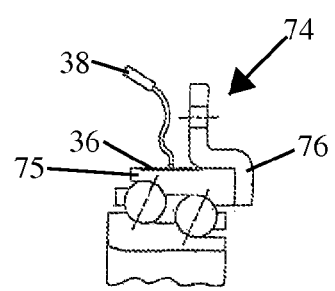

FIG. 11 shows a tandem ball bearing 74, on which the sensor 36 is arranged, an outer ring 75 with a recessed mounting bracket 76.

Figure 12:
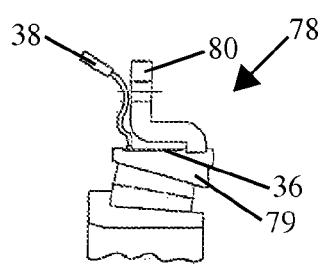

FIG. 12 shows a tapered roller bearing 78, on which the sensor 36 is arranged, an outer ring 79 with a recessed mounting flange 80.

Figure 13:
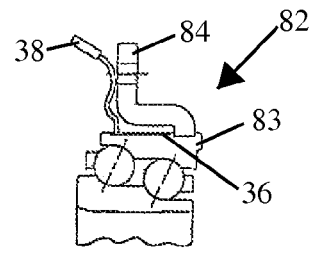

FIG. 13 shows a tandem ball bearing 82, on which the sensor 36 is arranged, an outer ring 83 with a recessed mounting bracket 84.

Figure 14:
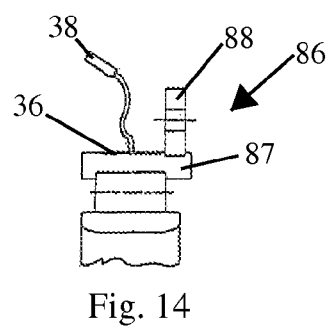

FIG. 14 shows a cylindrical roller bearing 86, on which the sensor 36 is arranger an outer ring 87 with a mounting bracket 88.

Figure 15:
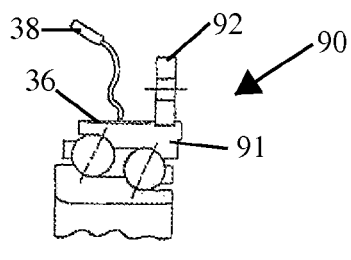

FIG. 15 shows a tandem bail bearing 90, on which the sensor 36 is arranged, an outer ring 91 with a mounting bracket 92.

Figure 16:
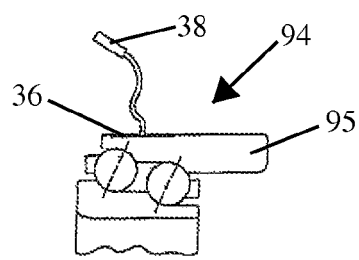

FIG. 16 shows a tandem ball bearing 94, which is a press-fit mounted, with the sensor 36 arranged an outer ring 95.

Figure 17:
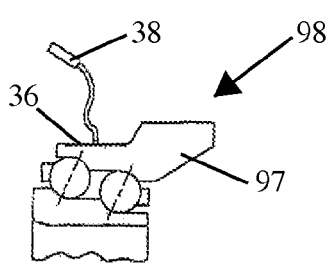

FIG. 17 shows a tandem ball bearing 96, which is a press-fit mounted, with the sensor 36 arranged an outer ring 97.

The present invention has been described with reference to a preferred embodiment. It should be understood that the scope of the present invention is defined by the claims and is not intended to be limited to the specific embodiment disclosed herein.

REFERENCE CHARACTERS

10 First Application of a Sensing and Measurement Bearing
12 Transmission System
14 Transmission Housing
16 Transmission Shaft
18 First Gear
20 Second Gear
22 Mounting Bracket
24 Fastener
26 Bearing Assembly
28 inner Ring
30 Outer Ring
32 Mounting Flange
34 Rollers
36 Sensor
38 Cable Link
39 Processor
40 Recess
42 Differential Application
44 Differential Housing
46 Differential Shaft
48 Gear
50 Non-Sensing Bearing
52 Angular Contact Ball Bearing
54 Mounting Shoulder
53 Outer Ring
56 Flange
58 Deep Groove Ball Bearing
59 Outer Ring
60 Mounting Shoulder
62 Flange
64 Tandem Ball Bearing
65 Outer Ring
66 Mounting Shoulder
68 Flange
70 Double Row Deep Groove Bali Bearing
71 Outer Ring
72 Mounting Flange
74 Tandem Ball Bearing
75 Outer Ring
76 Recessed Mounting Bracket
78 Tapered Roller Bearing
79 Outer Ring
80 Recessed Mounting Flange
82 Tandem Bail Bearing
83 Outer Ring
84 Recessed Mounting Bracket
86 Cylindrical Ball Bearing
87 Outer Ring
88 Mounting Bracket
90 Tandem Ball Bearing
91 Outer Ring
92 Mounting Bracket
94 Tandem Ball Bearing
96 Tandem Ball Bearing
97 Outer Ring

What is claimed:

1. A sensing and measurement system for a transmission assembly supporting a transmission shaft, comprising:
    a bearing assembly having an outer ring, an inner ring, a plurality of roller bodies arranged between the outer ring and the inner ring, a first sensor arranged directly on one of the rings to collect data and a cable link fixed to and extending from the first sensor to transmit the collected data;
    wherein the outer ring has a flange mountable to a transmission housing of the transmission assembly that supports the transmission shaft.

2. The sensing and measurement system of claim 1, wherein the bearing assembly is mountable in the transmission assembly on a recess of the transmission shaft.

3. The sensing and measurement system of claim 1, wherein the first sensor is mounted on an axial side of the inner ring or outer ring.

4. The sensing and measurement system of claim 1, wherein the first sensor is mounted on a radial surface of the inner ring or outer ring.

5. The sensing and measurement system of claim 1, wherein the first sensor is fixed to the outer ring.

6. The sensing and measurement system of claim 1, wherein the inner ring or the outer ring is stationary and the first sensor is fixed to the stationary ring.

7. The sensing and measurement system of claim 1, further comprising a second sensor, the first sensor being mounted on the inner ring and the second sensor being mounted the outer ring.

8. The sensing and measurement system of claim 7, wherein the first sensor and the second sensor are each mounted on an axial side of the inner ring or the outer ring.

9. The sensing and measurement system of claim 7, wherein the first sensor and the second sensor are each mounted on a radial side of the inner ring or the outer ring.

10. The sensing and measurement system of claim 1, further comprising bearing supports on which the sensor is mounted.

11. The transmission assembly of claim 1, wherein the transmission housing is a housing of a differential, the bearing assembly being mounted directly within the housing of the differential.

12. The sensing and measurement system of claim 1, wherein the sensor is arranged so that the data includes axial loading, radial force, and transmitted torque.

13. The sensing and measurement system of claim 1, wherein the sensor is arranged so that the data is measured directly within the transmission assembly.

14. The sensing and measurement system of claim 1, wherein the cable link is operative to transmit the data collected by telemetry.

15. The sensing and measurement system of claim 1, further comprising a processor, which amplifies, filters and converts the data collected from analog to digital.

16. A sensing and measurement system for a transmission assembly, comprising:
    a bearing assembly having an outer ring, an inner ring, a plurality of roller bodies arranged between the outer ring and the inner ring, a first sensor arranged directly on one of the rings to collect data and a cable link fixed to and extending from the first sensor to transmit the collected data;

a processor, which amplifies, filters and converts the data collected from analog to digital; and a processor that processes the data and calculates optimal operating characteristics by an algorithm resulting in forces, moments and torques, which are transmitted on a network through a controller to the transmission assembly.

17. The sensing and measurement system of claim 1, wherein the transmission sensing and measurement system is calibrated prior to installation.

18. The sensing and measurement system of claim 1, further comprising a processor that combines the collected data with wheel and engine data of a vehicle.

19. A method for measuring operating characteristics of a transmission, the method comprising:

assembling a bearing in a housing of the transmission, the bearing having an outer ring, an inner ring, a plurality of roller bodies arranged between the outer ring and the inner ring, a sensor arranged directly on one of the rings and a cable link fixed to and extending from the sensor to transmit data collected for review, analysis and adjustment of operating characteristics;

measuring strain data on the bearing via the sensor;

amplifying, filtering, and converting the data from analog to digital;

transmitting the data collected to a transmission controller; and processing the data and calculating optimal operating characteristics by an algorithm resulting in forces, moments, and torque, which are transmitted on a network through a controller to the transmission.

* * * * *